(12) United States Patent
Koskan et al.

(10) Patent No.: US 8,509,923 B2
(45) Date of Patent: Aug. 13, 2013

(54) METHODS FOR MANAGING POWER CONSUMPTION IN A SENSOR NETWORK

(75) Inventors: Patrick D. Koskan, Lake Worth, FL (US); Charles B. Swope, Coral Springs, FL (US)

(73) Assignee: Motorola Solutions, Inc., Schaumburg, IL (US)

(*) Notice: Subject to any disclaimer, the term of this patent is extended or adjusted under 35 U.S.C. 154(b) by 520 days.

(21) Appl. No.: 12/827,809

(22) Filed: Jun. 30, 2010

(65) Prior Publication Data

US 2012/0004782 A1    Jan. 5, 2012

(51) Int. Cl.
| | |
|---|---|
| G05B 11/01 | (2006.01) |
| G05D 3/12 | (2006.01) |
| G05D 9/00 | (2006.01) |
| G05D 11/00 | (2006.01) |
| G06F 1/32 | (2006.01) |
| G06Q 50/06 | (2012.01) |
| H02H 3/00 | (2006.01) |

(52) U.S. Cl.
CPC ........... *G06F 1/3203* (2013.01); *G06Q 50/06* (2013.01); *H02H 3/006* (2013.01)
USPC ............ 700/22; 700/286; 700/291; 700/295

(58) Field of Classification Search
USPC .................... 700/22, 295, 291, 286
See application file for complete search history.

(56) References Cited

U.S. PATENT DOCUMENTS

| | | | |
|---|---|---|---|
| 5,474,813 A * | 12/1995 | Walker et al. | 427/510 |
| 6,697,617 B2 | 2/2004 | Liebenow | |
| 6,826,607 B1 * | 11/2004 | Gelvin et al. | 709/224 |
| 6,832,251 B1 * | 12/2004 | Gelvin et al. | 709/224 |
| 6,859,831 B1 * | 2/2005 | Gelvin et al. | 709/224 |
| 6,873,839 B2 | 3/2005 | Stanforth | |
| 7,020,701 B1 * | 3/2006 | Gelvin et al. | 709/224 |
| 7,046,166 B2 * | 5/2006 | Pedyash et al. | 340/870.07 |
| 7,054,747 B2 | 5/2006 | Ruelke et al. | |
| 7,221,667 B2 | 5/2007 | Hori | |

(Continued)

FOREIGN PATENT DOCUMENTS

WO    2006043902 A1    4/2006

OTHER PUBLICATIONS

Agarwal, R.; Martinez-Catala, R.V.; Harte, S.; Segard, C. and O'Flynn, B., "Modeling Power in Multi-Functionality Sensor Network Applications", Aug. 2008, Second International Conference on Sensor Technologies and Applications, pp. 507-512.*

(Continued)

*Primary Examiner* — Mohammad Ali
*Assistant Examiner* — Kelvin Booker
(74) *Attorney, Agent, or Firm* — Valerie M. Davis; Kenneth A. Haas

(57) ABSTRACT

Methods for reducing sensor support power in a sensor network include a primary node locating a secondary node. The primary node has a primary node sensor profile, and the secondary node has a secondary node sensor profile. The secondary node sensor profile is compared to the primary node sensor profile. A virtual sensor profile is constructed based on the comparison between the primary and secondary sensor profiles. The virtual sensor profile reduces redundant sensor data gathering between the primary and secondary sensor nodes. A power consumption optimization hardware configuration for the secondary node is determined to provide sensor data for the virtual sensor profile, and the determined hardware configuration is assigned to the secondary node.

16 Claims, 8 Drawing Sheets

(56) References Cited

U.S. PATENT DOCUMENTS

| | | | |
|---|---|---|---|
| 7,224,937 B2 | 5/2007 | Cheng | |
| 7,304,976 B2* | 12/2007 | Mao et al. | 370/338 |
| 7,358,701 B2* | 4/2008 | Field et al. | 320/104 |
| 7,377,344 B2* | 5/2008 | Barske | 180/65.28 |
| 7,541,941 B2* | 6/2009 | Bogolea et al. | 340/870.02 |
| 7,693,589 B2* | 4/2010 | Miller | 700/79 |
| 7,710,257 B2* | 5/2010 | Miller | 340/517 |
| 7,710,258 B2* | 5/2010 | Miller | 340/522 |
| 7,710,259 B2* | 5/2010 | Miller | 340/522 |
| 7,710,260 B2* | 5/2010 | Miller | 340/522 |
| 7,738,413 B2* | 6/2010 | Varaiya et al. | 370/321 |
| 7,756,593 B2* | 7/2010 | Miller | 700/79 |
| 7,797,367 B1* | 9/2010 | Gelvin et al. | 709/200 |
| 7,823,082 B2* | 10/2010 | Miller | 715/810 |
| 7,825,891 B2* | 11/2010 | Yao et al. | 345/102 |
| 7,844,687 B1* | 11/2010 | Gelvin et al. | 709/220 |
| 7,864,037 B2* | 1/2011 | Miller | 340/506 |
| 7,992,094 B2* | 8/2011 | Miller | 715/771 |
| 8,046,180 B2* | 10/2011 | Huseth et al. | 702/60 |
| 8,086,547 B2* | 12/2011 | Miller | 706/11 |
| 8,107,397 B1* | 1/2012 | Bagchi et al. | 370/254 |
| 8,149,102 B1* | 4/2012 | Miller et al. | 340/506 |
| 8,234,876 B2* | 8/2012 | Parsonnet et al. | 62/59 |
| 8,253,346 B2* | 8/2012 | Budike, Jr. | 315/291 |
| 8,255,090 B2* | 8/2012 | Frader-Thompson et al. | 700/295 |
| 2002/0085516 A1 | 7/2002 | Bridgelall | |
| 2003/0134638 A1 | 7/2003 | Sundar | |
| 2003/0204371 A1* | 10/2003 | Sciamanna | 702/183 |
| 2004/0033778 A1 | 2/2004 | Fonseca, Jr. et al. | |
| 2004/0093516 A1* | 5/2004 | Hornbeek et al. | 713/201 |
| 2004/0113590 A1 | 6/2004 | Rosenquist | |
| 2004/0128310 A1 | 7/2004 | Zmudzinski et al. | |
| 2004/0203873 A1 | 10/2004 | Gray | |
| 2004/0217881 A1* | 11/2004 | Pedyash et al. | 340/870.07 |
| 2005/0041613 A1 | 2/2005 | Kuhl | |
| 2005/0210340 A1* | 9/2005 | Townsend et al. | 714/701 |
| 2005/0238046 A1 | 10/2005 | Hassan | |
| 2005/0249268 A1 | 11/2005 | Batra | |
| 2006/0099935 A1 | 5/2006 | Gallagher | |
| 2006/0121951 A1 | 6/2006 | Perdomo et al. | |
| 2006/0128350 A1 | 6/2006 | Hurwitz | |
| 2006/0234697 A1 | 10/2006 | Fernandez | |
| 2007/0010285 A1 | 1/2007 | Schmidt | |
| 2007/0038346 A1* | 2/2007 | Ehrlich et al. | 701/33 |
| 2007/0098009 A1 | 5/2007 | Du | |
| 2007/0111737 A1 | 5/2007 | Swope et al. | |
| 2007/0120959 A1 | 5/2007 | Wu | |
| 2007/0140157 A1 | 6/2007 | Fu | |
| 2007/0150565 A1* | 6/2007 | Ayyagari et al. | 709/223 |
| 2007/0165583 A1 | 7/2007 | Pecen | |
| 2007/0168425 A1 | 7/2007 | Morotomi | |
| 2007/0185660 A1* | 8/2007 | Anderson | 702/41 |
| 2007/0195808 A1* | 8/2007 | Ehrlich et al. | 370/408 |
| 2007/0205916 A1* | 9/2007 | Blom et al. | 340/870.17 |
| 2007/0239813 A1 | 10/2007 | Pinder et al. | |
| 2007/0287438 A1 | 12/2007 | Hansen | |
| 2008/0032738 A1 | 2/2008 | Boyer | |
| 2008/0102815 A1 | 5/2008 | Sengupta | |
| 2008/0113692 A1 | 5/2008 | Zhao et al. | |
| 2008/0130598 A1 | 6/2008 | Kalhan | |
| 2008/0172191 A1* | 7/2008 | Kim et al. | 702/61 |
| 2008/0192666 A1 | 8/2008 | Koskan | |
| 2008/0198811 A1 | 8/2008 | Deshpande | |
| 2008/0215609 A1* | 9/2008 | Cleveland et al. | 707/102 |
| 2008/0231449 A1 | 9/2008 | Moshfeghi | |
| 2008/0307075 A1* | 12/2008 | Urano et al. | 709/220 |
| 2009/0045936 A1* | 2/2009 | Miller | 340/500 |
| 2009/0045947 A1* | 2/2009 | Miller | 340/540 |
| 2009/0045948 A1* | 2/2009 | Miller | 340/540 |
| 2009/0045949 A1* | 2/2009 | Miller | 340/540 |
| 2009/0045950 A1* | 2/2009 | Miller | 340/540 |
| 2009/0048690 A1* | 2/2009 | Miller | 700/54 |
| 2009/0049088 A1* | 2/2009 | Miller | 707/103 Y |
| 2009/0049376 A1* | 2/2009 | Miller | 715/273 |
| 2009/0049401 A1* | 2/2009 | Miller | 715/810 |
| 2009/0059841 A1 | 3/2009 | Laroia | |
| 2009/0092075 A1 | 4/2009 | Corson | |
| 2009/0093916 A1* | 4/2009 | Parsonnet et al. | 700/286 |
| 2009/0135798 A1 | 5/2009 | Pecen | |
| 2009/0157529 A1* | 6/2009 | Ehlers et al. | 705/26 |
| 2009/0168703 A1* | 7/2009 | Pandey et al. | 370/329 |
| 2009/0185542 A1* | 7/2009 | Zhang et al. | 370/338 |
| 2009/0204265 A1* | 8/2009 | Hackett | 700/284 |
| 2009/0207769 A1* | 8/2009 | Park et al. | 370/311 |
| 2009/0309712 A1* | 12/2009 | Miller | 340/521 |
| 2010/0007289 A1* | 1/2010 | Budike, Jr. | 315/294 |
| 2010/0141399 A1* | 6/2010 | Swope | 340/10.33 |
| 2010/0148940 A1* | 6/2010 | Gelvin et al. | 340/286.02 |
| 2010/0201516 A1* | 8/2010 | Gelvin et al. | 340/539.26 |
| 2010/0274407 A1* | 10/2010 | Creed | 700/295 |
| 2010/0280677 A1* | 11/2010 | Budike, Jr. | 700/296 |
| 2011/0035491 A1* | 2/2011 | Gelvin et al. | 709/224 |
| 2011/0066297 A1* | 3/2011 | Saberi et al. | 700/287 |
| 2011/0085442 A1* | 4/2011 | Lin et al. | 370/235 |
| 2011/0143779 A1* | 6/2011 | Rowe et al. | 455/456.3 |
| 2011/0254760 A1* | 10/2011 | Lloyd et al. | 345/156 |
| 2011/0294429 A1* | 12/2011 | Shirakata et al. | 455/41.2 |
| 2011/0299423 A1* | 12/2011 | Shim et al. | 370/254 |
| 2012/0079091 A1* | 3/2012 | Ermis et al. | 709/223 |
| 2012/0079092 A1* | 3/2012 | Woxblom et al. | 709/223 |
| 2012/0194799 A1* | 8/2012 | Kamiyama et al. | 356/5.01 |
| 2012/0200841 A1* | 8/2012 | Kamiyama et al. | 356/5.01 |
| 2012/0200842 A1* | 8/2012 | Kamiyama et al. | 356/5.03 |
| 2012/0203600 A1* | 8/2012 | Fiorucci et al. | 705/13 |
| 2012/0205548 A1* | 8/2012 | Friedman | 250/375 |

OTHER PUBLICATIONS

Chang, C.C.; Nagel, D.J. and Muftic, S., "Assessment of Energy Consumption in Wireless Sensor Networks: A Case Study for Security Algorithms", Oct. 2007, International Conference on Mobile Adhoc and Sensor Systems.*

Itoh, T.; Zhang, Y.; Matsumoto, M. and Maeda, R., "Wireless Sensor Network for Power Consumption Reduction in Information and Communication Systems", Oct. 2009, 2009 IEEE Sensors, pp. 572-575.*

Macii, D.; Ageev, A. and Somov, A., "Power Consumption Reduction in Wireless Sensor Networks Through Optimal Synchronization", May 2009, IEEE Instrumentation and Measurement Technology Conference, 2009, pp. 1346-1351.*

Postolache, O.; Pereira, J.M. and Girao, P., "Distributed Air Quality Monitoring Based on Bluetooth Sensing Nodes and Virtual TEDS", Jul. 2007, International Conference on Electronic Mearsurement and Instruments, 2007, pp. 4-1-4-6.*

Sakhaee, E.; Wakamiya, N. and Murata, M., "A Transmission Range Reduction Scheme for Reducing Power Consumption in Clustered Wreless Sensor Networks", Nov. 2009, IEEE Global Telecommunications Conference, pp. 1-6.*

Shaflulah, G.M.; Thompson, A.; Wolfs, P.J. and Ali, S., "Reduction of Power Consumption in Sensor Network Applications Using Machine Learning Techniques", Nov. 2008, TENCON 2008—2008 IEEE Region 10 Conference, pp. 1-6.*

Chen, S C and Lee, K., "A Mixed-Mode Smart Transducer Interface for Sensors and Actuators", Apr. 1998, Sound and Vibration.*

IEEE, "IEEE Standard for a Smart Transducer Interface for Sensors and Actuators—Digital Communication and Transducer Electonic Data Sheet (TEDS) Formats for Distributed Multidrop Systems", Mar. 2004, IEEE Standard 1451.3, Technical Committee 9 on Sensor Technology (TC-9).*

IEEE, "IEEE Standard for a Smart Transducer Interface for Sensors and Actuators—Wireless Communication Protocols and Transducer Electonic Data Sheet (TEDS) Formats", Oct. 2007, IEEE Standard 1451.5, Technical Committee on Sensor Technology (TC-9).*

Postolache, O.; Girao, P.S.; and Pereira, J.M.D., Data Storage, "Chapter 10: Non-Volatile Memory Interface Protocols for Smart Sensor Networks and Mobile Devices", Apr. 2010, InTech, "www.intechopen.com".*

Ostmark, A., "Embedded Internet System Architectures", Jul. 2004, Graduate Thesis, Lulea University of Technology, Department of Computer Science and Electrical Engineering (EISLAB), Lulea, Sweden.*

Pandian, P.S.; Safeer, K.P.; Gupta, P.; Shakunthala, D.T.; Sundersheshu, B.S. and Padaki, V.C., "Wireless Sensor Network for Wearable Physiological Monitoring", May 2008, Journal of Networks, vol. 3, No. 5.*

Sammarco, J.J.; Paddock, R.; Fries, E.F.; and Karra, V.K., "A Technology Review of Smart Sensors With Wireless Networks for Applications in Hzardous Work Environments", Apr. 2007, Department of Health and Human Services, Centers for Disease Control and Prevention, Pittsburgh Research Laboratory, Pittsburgh, PA, Publication No. 2007-114.*

Shnayder, V.; Hempstead, M.; Chen, B.; Allen, G.W.; and Welsh, M., "Simulating the Power Consumption of Large-Scale Sensor Network Applications", Nov. 2004, SenSys 2004, Baltimore, MD.*

Sung, J. and Kim, D., "Sensor Profile Requirements for Sensor Network Capability Information in the EPCglobal Network", Mar. 2009, AutoIDLabs-White Paper, WP-Software-027, "www.autoidlabs.org".*

Wobschall, D., "A Wireless Gas Monitor with IEEE 1451 Protocol", Feb. 2006, SAS 2006—IEEE Sensors Applications Symposium, Houston, TX.*

IEEE, "IEEE Standard for a Smart Transducer Interface for Sensors and Actuators—Transducer to Microprocessor Communication Protocols and Transducer Electronic Data Sheet (TEDS) Formats", Sep. 1997, IEEE Standard 1451.2, Technical Committee 9 on Sensor Technology (TC-9).*

Dunkels, A.; Osterlind, F.; Tsiftes, N.; and He, Z., "Software-based On-line Energy Estimation for Sensor Nodes", Jun. 2007, EmNets 2007, Cork, Ireland.*

Romanchik, D., "Tips for Using TEDS Sensors", Aug. 2004, Retrieved from the Internet on Dec. 1, 2012 at "http://tmworld.com/home/printview?contentitemid=4387035".*

Younis, M.; Youssef, M.; and Arisha, K., "Energy-Aware management for Cluster-based Sensor Networks", Apr. 2003, Computer Networks, vol. 43, pp. 649-668.*

Sakhaee, E.; Wakamiy, N.; and Murata, M., "Self-Organized Data-Energy-Aware Clustering and Routing for Wireless Sensor Networks", 2009, 2009 Intl Conference on Computational Science and Engineering.*

Weddell, A.S.; Grabham, N.J.; Harris, N.R. and White, N.M., "Modular Plug-and-Play Power Resources for Energy-Aware Wireless Sensor Nodes", Jun. 2009, SECON 2009.*

Yanagihara, K.; Taketsugu, J.; Fukui, K.; Fukunaga, S.; Hara, S. and Kitayama, K.-I., "EACLE: Energy-Aware Clustering Scheme with Transmission Power Control for Sensor Networks", 2007, Wireless Personal Communictions, vol. 40, pp. 401-415.*

Colkin, E., "Personalization Tools Dig Deeper," Aug. 27, 2001, pagers 5, accessed at http://www.informationweek.com/news/6506249.

Postel, J., "User Datagram Protocol," RFC 768, Aug. 28, 1980.

Postel, J., "Internet Protocol Darpa Internet Program Protocol Specification," RFC 791, Sep. 1981.

Schulzrinne, H., "RTP: A Transport Protocol for Real-Time Applications," Network Working Group, RFC 3550, Jul. 2003.

"IEEE 1451.4 Sensor Templates Overview," National Instruments, Sep. 6, 2006, pp. 12 accessed at http://www.ni.com/white-paper/3468/en#toc0.

Luo, et al. "UCAN:A Unified Cellular and Ad-Hoc Network Architecture"; XP-001186730; Sep. 14, 2003; 16 Pages.

Multiuser Cooperative Diversity for Wireless Networks; 3rd Quarter, 2006; 2 Pages.

Lin, et al. Multihop Cellular: A New Architecture for Wireless Communications; 2 Pages; 2000.

Holger, Karl, et al. Relaying in Wireless Access Networks; 6 Pages http://www.tkn.tu-berlin.de/publications/papers/karlBusinessBriefingRelayAdHoc.pdf, Jan. 2002, Wireless Technology 2002, London, England.

Hui, et al. "The Impact of Relaying Strategies on the Performance in Cellular System"; 4 Pages; Proceedings of ISCIT 2005.

Xie, et al. Multi-Hop Cellular IP: A New Approach to Heterogeneous Wireless Networks; 16 Pages; Jul. 1, 2005.

Zhao, et al. "Real-Time Traffic Support in Relayed Wireless Access Networks Using IEEE 802.11"; IEEE Wireless Communications; Apr. 2004; 8 Pages.

* cited by examiner

METHODS FOR MANAGING POWER CONSUMPTION IN A SENSOR NETWORK

TECHNICAL FIELD

The present disclosure relates generally to communication systems and in particular to a system and method for reducing sensor support power in a sensor network.

BACKGROUND

First responders and other public safety professionals, as well as military and government emergency response personnel, provide relief services within unpredictable and hazardous environments. In an effort to improve safety and response efficiencies in such situations, wireless sensor networks are deployed to provide remote monitoring and situational awareness. These wireless sensor networks generally include various arrangements of sensors or sensor clusters that are provided at a location over an extended period.

Critical operational decisions within a relief effort often rest on the long-term reliability of such sensor networks. Therefore, among other requirements, wireless sensor networks and their related components require reliable, extended periods of operation. Unfortunately, current wireless sensor networks are unable to compensate for a partial network failure. Additionally, a low-power condition at one or more components throughout the sensor network, collectively, diminishes the overall effectiveness and reliability of the network. Poor sensor network conditions jeopardize the safety and optimal performance critical for making informed decisions within a mission-critical relief effort.

Accordingly, there is a need for a system and method for reduced sensor power in a sensor network.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
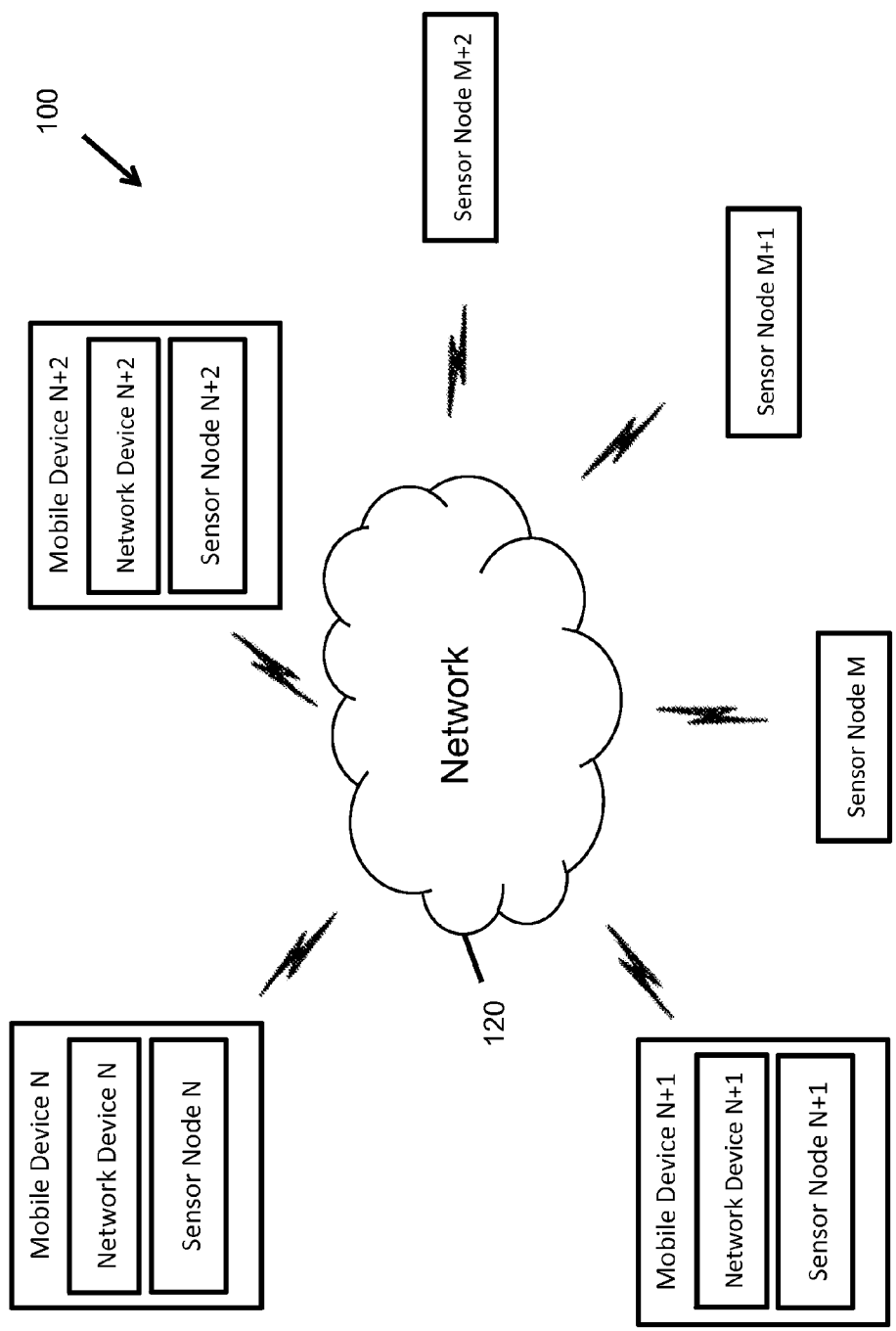
FIG. 1 illustrates a sensor network in accordance with various embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method for reducing sensor support power in a sensor network. Illustrative embodiments of the present disclosure are described below with reference to stand-alone sensors or sensor clusters, for example, among others, sensors or sensor clusters integrated within a mobile communications device including a mobile radio communications device. However, at least some of the illustrative embodiments, and their associated advantages, can be implemented and appreciated in a variety of other mobile or fixed communication devices that are capable of supporting the systems and methods as described herein.

Accordingly, methods for reducing sensor support power in a sensor network include a primary node locating a secondary node. The primary node has a primary node sensor profile, and the secondary node has a secondary node sensor profile. The secondary node sensor profile is compared to the primary node sensor profile. A virtual sensor profile is constructed (which includes modifying an existing virtual sensor profile or creating a new virtual sensor profile) from the comparison between the primary and secondary sensor profiles. The virtual sensor profile reduces redundant sensor data gathering between the primary and secondary sensor nodes. Moreover, a power consumption optimization hardware configuration for the secondary node is identified to provide sensor data for the virtual sensor profile. The identified hardware configuration is assigned to the secondary node.

Methods for collaborative operation of a plurality of sensor units in a sensor network for managing power consumption in the sensor network include a first sensor unit determining an environment and power profile of the first sensor unit. The first sensor unit communicates with a second sensor unit to identify an environment and power profile of the second sensor unit. The environment and power profiles of the first and second sensor units are compared with respect to one another. A power consumption optimization hardware configuration for each of the first and second sensor units is determined based on the comparison. The hardware configuration of at least one of the first sensor unit or the second sensor unit is changed based on the determined power consumption optimization hardware configurations. The changed hardware configuration disables a sensor function in at least one of the first or second sensor units thereby reducing power consumption in at least one of the first or second sensor units.

A system for managing power consumption in a sensor network as disclosed herein includes a network, a first sensor node coupled to the network, and a second sensor node coupled to the network. The first sensor node includes a first sensor profile, and the second sensor node includes a second sensor profile. The second sensor node is in communication with the first sensor node by way of the network. The first sensor profile is compared to the second sensor profile to construct a virtual sensor profile that reduces redundant sensor data gathering between the first sensor node and the second sensor node. A power consumption optimization hardware configuration for the second sensor node is determined to provide sensor data for the virtual sensor profile. The determined hardware configuration is assigned to the second sensor node.

The systems and methods reducing sensor support power, as described in this disclosure, are compatible with established industry standards and protocols. For example, various embodiments as described herein are compatible with established and emerging standards for smart transducers, for example, as described in the Institute of Electrical and Electronics Engineers (IEEE) 1451 standards suite. In particular, various embodiments advantageously utilize a Transducer Electronic Data Sheet (TEDS) as described in the emerging IEEE standard 1451.4 that provides for, among other functionalities, transducer self-identification in a sensor network. In addition, aspects of the present disclosure are compatible with IEEE 1451.0 that provides for, among others, assigning sensor mission configurations. Wireless communication between sensor nodes, in some aspects, is compatible with IEEE 1451.5 that defines, among others, wireless communications protocols between smart transducers.

Moreover, radio communications devices, as described herein, are compliant with established standards and protocols for radio communications widely known in the industry, for example, as is described in the Telecommunications Industry Association (TIA) 102 series documents. The TIA 102 documents include a description of radio communication over a Common Air Interface (CAI) as described, for example, in TIA-102.BAAA published January 1996 by the TIA and any subsequent revisions. The CAI defines a standard for radio-to-radio communication. In particular, using the CAI, any P25-compatible radio can communicate with any other P25-compatible radio.

Also, communications networks and devices incorporating various aspects of the present disclosure advantageously utilize standard IP protocols. Such IP protocols include user datagram protocol (UDP)/internet protocol (IP) connections as described in Internet Engineering Task Force (IETF) Request for Comments (RFC) 768 dated August 1980 and any subsequent revisions, and as described in IETF RFC 791 dated September 1981 and any subsequent revisions, as well as real-time transport protocol (RTP), as described, for example, in IETF RFC 3550 dated July 2003 and any subsequent revisions.

While embodiments of the present disclosure employ various teachings of the aforementioned standards and protocols, the embodiments as described herein are not limited by these protocols. Further, the benefits and advantages as described herein are applicable to any combination of servers, networks, and other hardware/software devices that are capable of supporting the embodiments disclosed below. Those skilled in the art will readily realize that the above recognized advantages and other advantages described herein are merely illustrative and are not meant to be a complete rendering of all of the advantages of the various embodiments.

Referring now to the figures, FIG. 1 shows a wireless sensor network 100 in accordance with various embodiments of the present disclosure. In some implementations, a sensor node is integrated within a mobile communications device, as illustrated in FIG. 1 by a mobile device N having a sensor node N, a mobile device N+1 having a sensor node N+1, and a mobile device N+2 having a sensor node N+2. As used herein, a "mobile device" illustratively includes a mobile radio, a cellular phone, a personal digital assistant (PDA), a computer, as well as any other combination of software and hardware devices useful for communicating with a network 120. In other aspects, a sensor node is a stand-alone device, as illustrated in FIG. 1 by a sensor node M, a sensor node M+1, and a sensor node M+2. For purposes of this disclosure, a "sensor node" includes at least one sensor or actuator, in addition to other processing or memory devices, as discussed below with reference to FIG. 2. Further, as used herein, the term "sensor node" is interchangeably used in this disclosure with the terms "sensor cluster" and "sensor unit". In addition, a "sensor" is defined as a device that measures a physical quantity and converts it into a signal that can be read by an observer or by an instrument. An "actuator" is defined as a mechanical device for moving or controlling a mechanism or system by accepting energy (e.g., electrical, mechanical, etc.) and converting the energy into motion. It should be noted that the use of the term sensor implies a sensor or actuator as defined, and the use of the term actuator implies an actuator or sensor as defined.

Each of the sensor nodes N, N+1, N+2, M, M+1, M+2 are in wireless communication with the network 120. In alternative embodiments, a connection between each of the sensor nodes N, N+1, N+2, M, M+1, M+2 and the network 120 is a wired connection. In some embodiments, each of the sensor nodes N, N+1, N+2, M, M+1, M+2 includes one or more network connectivity devices, as discussed below, for directly communicating with the network 120. Alternatively, in other implementations, the mobile device N includes a network device N, the mobile device N+1 includes a network device N+1, and the mobile device N+2 includes a network device N+2. As such, one or more of the sensor nodes N, N+1, N+2 optionally communicates with the network 120 by way of the network devices N, N+1, N+2.

Illustratively, the sensor nodes N, N+1, N+2, M, M+1, M+2 are configured to sense one or more identical environmental parameters due to having the same location or proximity. Moreover, when deployed, two or more of the sensor nodes N, N+1, N+2, M, M+1, M+2 are collocated, meaning that the sensor nodes are within a range of one another such that a redundancy is established in one or more of the sensed environmental parameters, thereby generating the collection of redundant or duplicate sensor information. In accordance with various embodiments, and by way of communication via the network 120, the sensor nodes N, N+1, N+2, M, M+1, M+2 form a self-configuring collective that optimize resource expenditures among each of the sensor nodes to maximize the performance and survival of the sensor network 100. In various aspects, as used herein, the term "self-configuring" refers to the ability of sensor nodes within the sensor network 100 to dynamically adapt to changing power and functional resources, while optimizing resource expenditures among each of the sensor nodes. Various aspects of the present disclosure are illustratively discussed in greater detail with respect to FIGS. 2-8 below.

In various embodiments, the network 120 includes an internet protocol (IP)-based radio access network (IP-based RAN), a local area network (LAN)/wide area network (WAN) Enterprise or IMS environment. Further, the network 120 features any combination of network connectivity devices such as modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), time division multiple access (TDMA) and global system for mobile communications (GSM) radio transceiver cards, and other network devices of a type well-known in the industry. Such network connectivity devices permit the network 120 to communicate with a global information system, an intranet, or a plurality of intranets. In various embodiments, the network 120 comprises a broadband network implemented by way of a digital subscriber line (DSL), an integrated service digital network (ISDN), a T-1 line, a satellite connection, an EV-DO connection, or a Worldwide Interoperability for Microwave Access (WiMAX) connection, among others.

Figure 2:
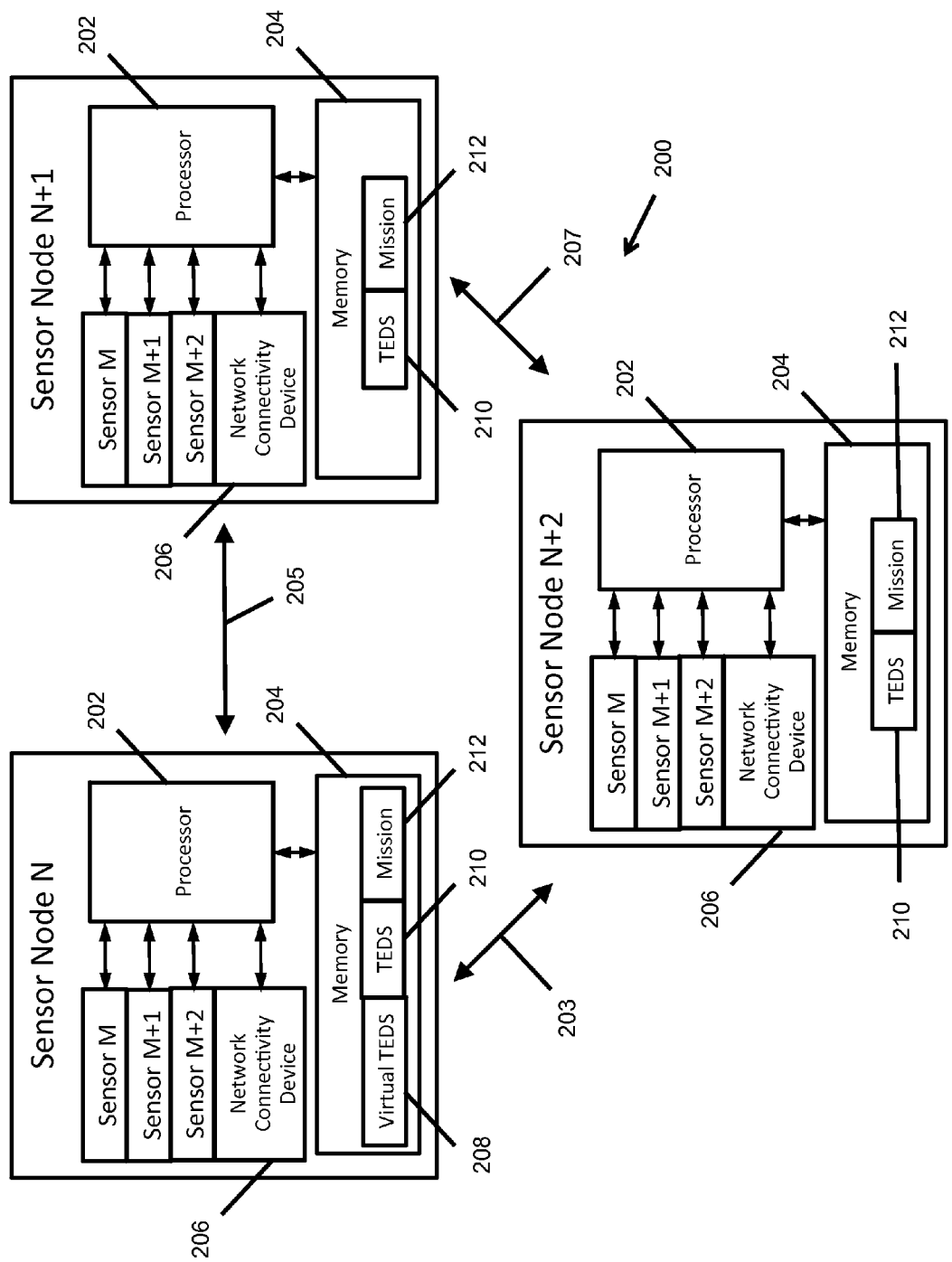
FIG. 2 illustrates a sensor network and method in accordance with at least one embodiment.

FIG. 2 illustrates a sensor network 200 and method in accordance with some embodiments. The sensor network 200 includes a sensor node N, a sensor node N+1, and a sensor node N+2 in communication with one another as indicated by arrows 203, 205, 207. In particular, each sensor node includes a network connectivity device 206 for establishing communication between the various sensor nodes. The network connectivity device 206 includes any combination of modems, modem banks, Ethernet cards, USB interface cards, serial port interfaces (e.g., compliant to the RS-232 standard), parallel port interfaces, a FireWire interface, token ring cards, FDDI cards, WLAN cards, a GPS receiver, radio transceiver cards such as CDMA and/or GSM radio transceiver cards, devices utilizing various wireless personal access network (WPAN) protocols such as for example, BLUETOOTH or ZIGBEE, and other well-known network devices that are operable in accordance with any one or more standard or proprietary interfaces.

Each of the sensor nodes N, N+1, N+2 is illustratively shown including a plurality of sensors M, M+1, M+2. However, in other embodiments, each of the sensor nodes N, N+1, N+2 can have more or less individual sensors or actuators. Illustratively, each of the sensors M, M+1, M+2 includes any combination of sensors or actuators such as a motion sensor, a light sensor, a temperature sensor, a humidity sensor, a gas sensor, an audio sensor, a tactile sensor, an air flow sensor, a magnetic field sensor, a metal detector, an altitude sensor, a pressure sensor, an image sensor, a radiation sensor, and other sensors or actuators, for example, of a type well-known in the industry.

The plurality of sensors M, M+1, M+2, and the network connectivity device 206 are coupled to a processor 202. Illustratively, in various embodiments, the processor 202 includes any combination of at least one of a digital signal processor, a reduced instruction set computer processor, a microcontroller, or a microprocessor. Furthermore, the processor 202 couples to a memory 204. In some implementations, the memory 204 includes any combination of at least one of a read only memory (ROM), a random access memory (RAM), a flash memory, and any combination of one or more disk drives or tape drives such as, for example, a hard disk, a floppy disk, and an optical disk.

As shown within each of the sensor nodes N, N+1, N+2, the memory 204 includes a Transducer Electronic Data Sheet (TEDS) 210. Each TEDS 210 includes data for each of the plurality of sensors M, M+1, M+2 stored in a standardized format in accordance with the emerging IEEE standard 1451.4. For example, the TEDS 210 data includes any combination of a transducer identification, measurement range data, calibration data, correction data, application specific user data, manufacturer-related data, and a current transducer or sensor reading. Among other functions, the TEDS 210 data enables transducer self-identification, system self-configuration, and simplifies integration within the sensor network 200.

The memory 204 of each of the sensor nodes N, N+1, N+2 further includes a mission configuration 212 that defines which of sensors M, M+1, M+2 are required for each of the sensor nodes N, N+1, N+2 to complete their individually assigned mission. The mission configuration 212 for each sensor node N, N+1, N+2 are pre-defined, for example, based on deployment requirements, sensor node battery life, or other user-defined or external factors.

In addition to the TEDS 210 and the mission configuration 212, sensor node N illustrates a "virtual TEDS" 208, as described in more detail below with respect to FIG. 3. Generally, the virtual TEDS 208 is a virtual sensor profile that reduces redundant sensor data gathering among the sensor nodes N, N+1, N+2 by comparing each sensor node's TEDS 210 data and mission configuration 212. Based on such comparison, the virtual TEDS 208 is constructed. The virtual TEDS 208 describes a superset of sensors within the sensor network 200 that need to be actively operated. Those individual sensors M, M+1, M+2 within each of the sensor nodes N, N+1, N+2 that are found to provide redundant data (e.g., due to collocation of sensor nodes) or that are not required based on the sensor node's mission configuration 212, can be shut off to conserve power and extend the overall life of the sensor network 200. In various embodiments, the virtual TEDS 208 is stored within the memory 204 of any combination of the sensor nodes N, N+1, and N+2.

Figure 3:
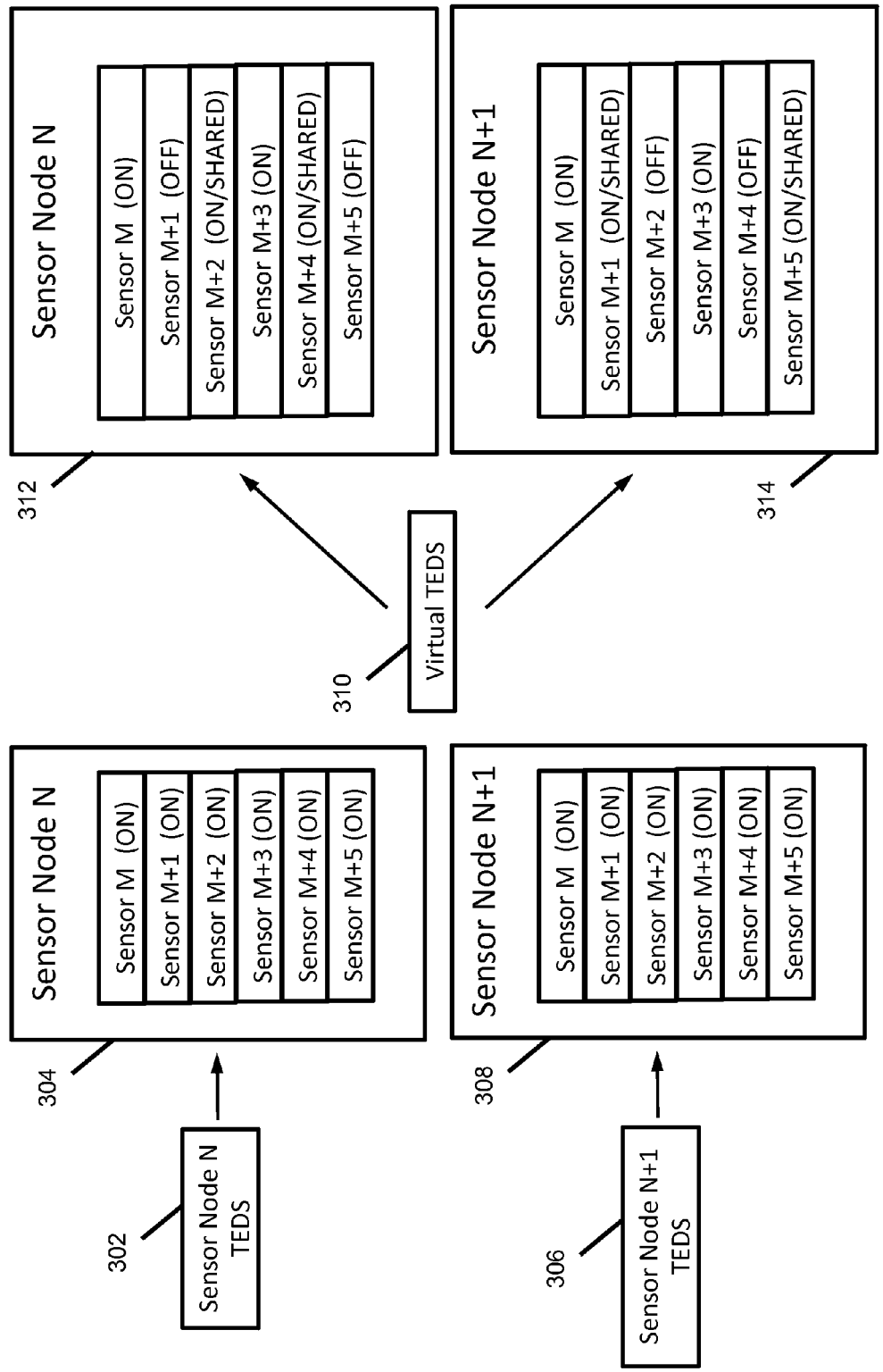
FIG. 3 illustrates a method of controlling sensor functions in accordance with some embodiments.

Referring now to FIG. 3, a method of controlling sensor functions in accordance with various embodiments is illustrated. In particular, a sensor node 304 and a sensor node 308 include an identical set of sensors M, M+1, M+2, M+3, M+4, M+5. As shown, the sensor node 304 includes an associated TEDS 302 and the sensor node 308 includes an associated TEDS 306. Illustratively, each of the sensor nodes 304 and 308 are collocated yet operate independently of each other. By way of example, the sensor node 304 activates each of its sensors M, M+1, M+2, M+3, M+4, M+5 in accordance with its mission configuration and in support of its associated TEDS 302. Similarly, the sensor node 308 activates each of its sensors M, M+1, M+2, M+3, M+4, M+5 in accordance with its mission configuration and in support of its associated TEDS 306.

Thus each of the sensor nodes 304, 308 actively operate six sensors each. Due to the collocation of the sensor nodes 304 and 308, redundant sensor information is collected by the sensors M, M+1, M+2, M+3, M+4, M+5 at each of the sensor nodes 304, 308. Embodiments of the present disclosure advantageously utilize networked communications between each of the sensor nodes 312 and 314 and a virtual TEDS 310 to administer each of the sensors M, M+1, M+2, M+3, M+4, M+5 within the sensor nodes 312 and 314, as shown in FIG. 3. In particular, the TEDS for each of the sensor nodes 312 and 314 are compared and the virtual TEDS 310 is constructed such that redundant sensor data gathering between the sensor nodes 312 and 314 is reduced. By comparison of the TEDS for each of the sensor nodes 312 and 314 and construction of the virtual TEDS 310, each sensor node 312, 314 is cognitively aware, not only of its own capabilities, mission configuration, and power supply and sensor current drain or "power profile", but also that of other sensor nodes.

Due to this cognitive awareness of the collocated sensor nodes 312, 314, and enabled by the virtual TEDS 310, the sensor nodes 312, 314 determine how to optimally share the work load between one another to extend the life of the sensor network and that of each sensor node 312, 314, while simultaneously continuing to support the respective TEDS. As shown in FIG. 3, the sensor node 312 has turned off sensors M+1 and M+5, but the sensor node 314 is sharing sensor data for sensors M+1 and M+5 with the sensor node 312 by way of the virtual TEDS 310 and the networked connection. Likewise, the sensor node 314 has turned off sensors M+2 and M+4, but the sensor node 312 is sharing sensor data for sensors M+2 and M+4 with the sensor node 314 by way of the virtual TEDS 310 and the networked connection. Thus, instead of each sensor nodes 312, 314 actively operating six sensors each, each of the sensor nodes 312, 314 thus operate only four sensors each and have a reduced sensor load. However, each of the sensor nodes benefits from the full capacity of the virtual TEDS 310 that is shared by each of the sensor nodes 312, 314.

Figure 4:
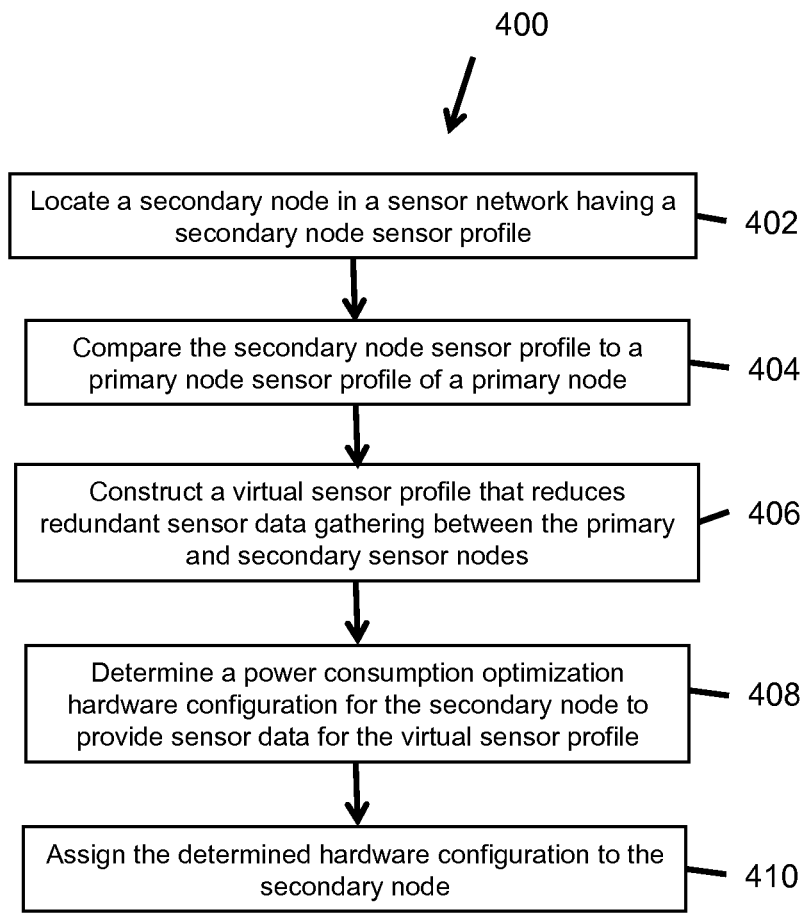
FIG. 4 is a logical flowchart showing an illustrative method for managing power consumption in a sensor network in accordance with some embodiments.

FIG. 4 is a logical flowchart showing an illustrative method 400 for managing power consumption in a sensor network in accordance with some embodiments. The sensor network has a primary node and a secondary node. Accordingly, at 402 a primary node locates a secondary node. The primary node has a primary node sensor profile, and the secondary node has a secondary node sensor profile. As used herein, a "sensor profile" for a single sensor node is defined as a collection of data from a set (one or more) or sensors included in the single sensor node. In one illustrative implementation, a sensor profile is equivalent to a "TEDS file" or a "TEDS profile".

At 404, the secondary node sensor profile is compared to the primary node sensor profile. Based on the comparison between the primary and secondary sensor profiles, at 406 a virtual sensor profile is constructed. As used herein, the "virtual sensor profile" means a collection of data from multiple sensors across multiple sensor nodes. In one illustrative implementation, a virtual sensor profile is equivalent to a "virtual TEDS" or a "virtual TEDS profile". The virtual sensor profile reduces redundant sensor data gathering between the primary and secondary sensor nodes.

At 408, a power consumption optimization hardware configuration for the secondary node is determined to provide sensor data for the virtual sensor profile. In various embodiments, the power consumption optimization hardware configuration is determined, at least in part, by a computational optimization algorithm, such as a statistical algorithm like a Monte Carlo type analysis, performed by the processor 202 as illustrated in FIG. 2. At 410, the determined hardware configuration is assigned to the secondary node. The determined power consumption optimization hardware configuration represents a recommended sensor node work load ownership as required to support the virtual TEDS and operate with a minimized power consumption.

Figure 5:
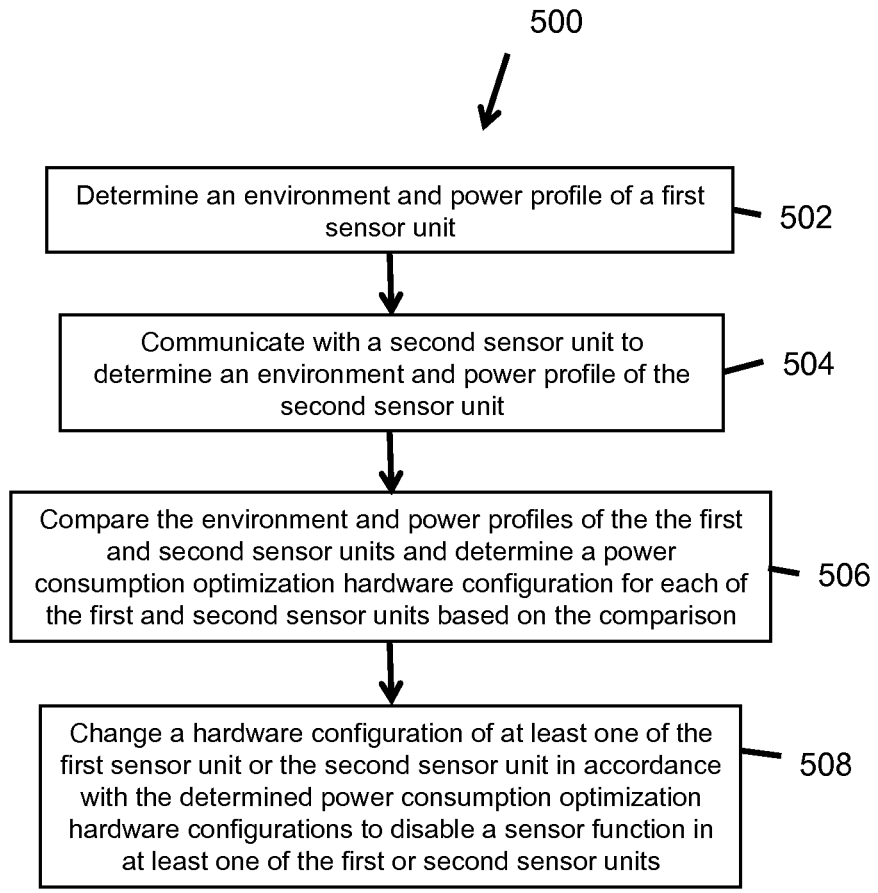
FIG. 5 is a logical flowchart showing an illustrative method for collaborative operation of a plurality of sensor units in a sensor network to manage power consumption in the sensor network in accordance with some embodiments.

FIG. 5 is a logical flowchart showing an illustrative method 500 for collaborative operation of a plurality of sensor units in a sensor network to manage power consumption in the sensor network in accordance with some embodiments. The plurality of sensor units includes a first sensor unit and a second sensor unit. Accordingly, at 502, the first sensor unit determines its environment and power profile. As used herein, the term "environment" includes one or more of sensor or actuator inputs of an environment into a sensor node, functional capabilities of the sensor node, or an operational state of all on-board sensor functions. The term "power profile" refers to a status of a sensor node's power resources. In various embodiments, the power profile further include a sensor node's remaining power supply and power usage of various sensor circuits.

At 504, the first sensor unit communicates with the second sensor unit to determine an environment and power profile of the second sensor unit. The environment and power profiles of the first and second sensor units are compared, at 506 to determine a power consumption optimization hardware configuration for each of the first and second sensor units. At 508, the hardware configuration of at least one of the first sensor unit or the second sensor unit is changed in accordance with the determined power consumption optimization hardware configurations. The changed hardware configuration disables a sensor function in one or both of the first or second sensor units. This results in a reduced sensor load for at least one of the first or second sensor units in the sensor network, thus extending the life of the sensor network while continuing to support an associated virtual TEDS profile.

Figure 6:
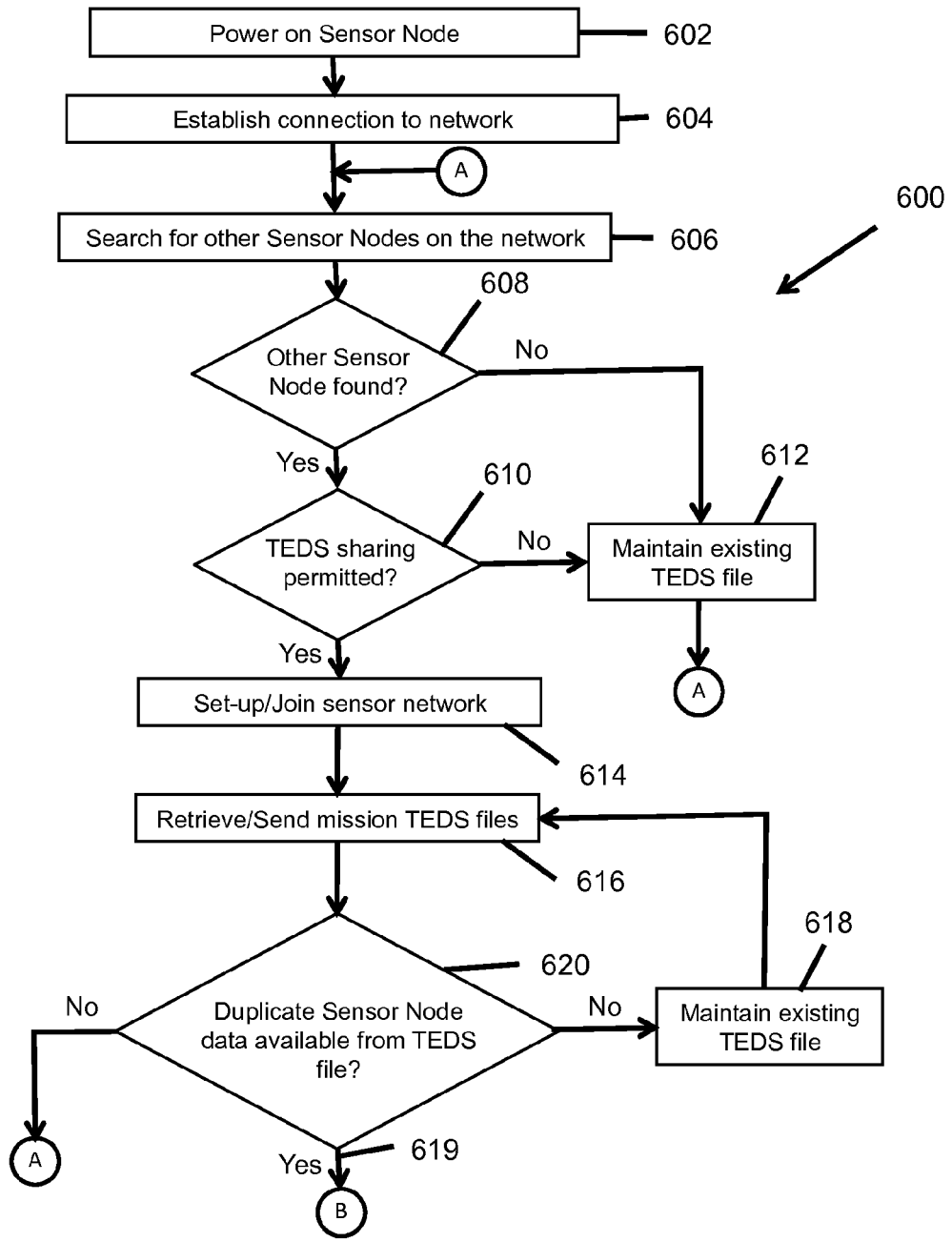
FIG. 6 is a logical flowchart showing an illustrative method for establishing a sensor network in accordance with some embodiments.

FIG. 6 is a logical flowchart showing an illustrative method 600 for establishing a sensor network in accordance with some embodiments. Accordingly, at 602 a sensor node is powered on, and a connection to a network is established at 604. The sensor network utilizes various networking protocols and interfaces as described above and may include, among others, a personal access network (WPAN), a WiFi network, or other well-known ad-hoc network devices and protocols including integrated smart transducers that utilize TEDS files. The sensor node searches for other sensor nodes on the sensor network, at 606. If another sensor node is not found, at 608, then an existing TEDS file of the searching sensor node is maintained, at 612, and the sensor node continues to search for other sensor nodes, at 606. If another sensor node is found, at 608, it is determined whether there exists a permission to share a TEDS file, at 610.

Without permission, the existing TEDS file of the searching sensor node is maintained, at 612, and the sensor node searches for another sensor node on the network, at 606. With permission granted, at 610, a sensor network is established at 614, if the sensor network does not yet exist. If the sensor network already exists, then the searching sensor node joins the existing sensor network at 614.

TEDS files, including mission configurations, are sent and received between a pair of sensor nodes in the sensor network, at 616. At 620, a determination is made regarding whether duplicate or redundant sensor node data is available from the TEDS files of the sensor nodes in the sensor network that have exchanged TEDS files at 616. If no duplicate sensor node data is found, at 620, then the existing TEDS files are maintained, at 618, and TEDS files are sent and received between another pair sensor nodes in the sensor network, at 616, and the process also returns to block 606 to search for other sensor nodes on the network, as indicated by the arrow to "A".

Figure 7:
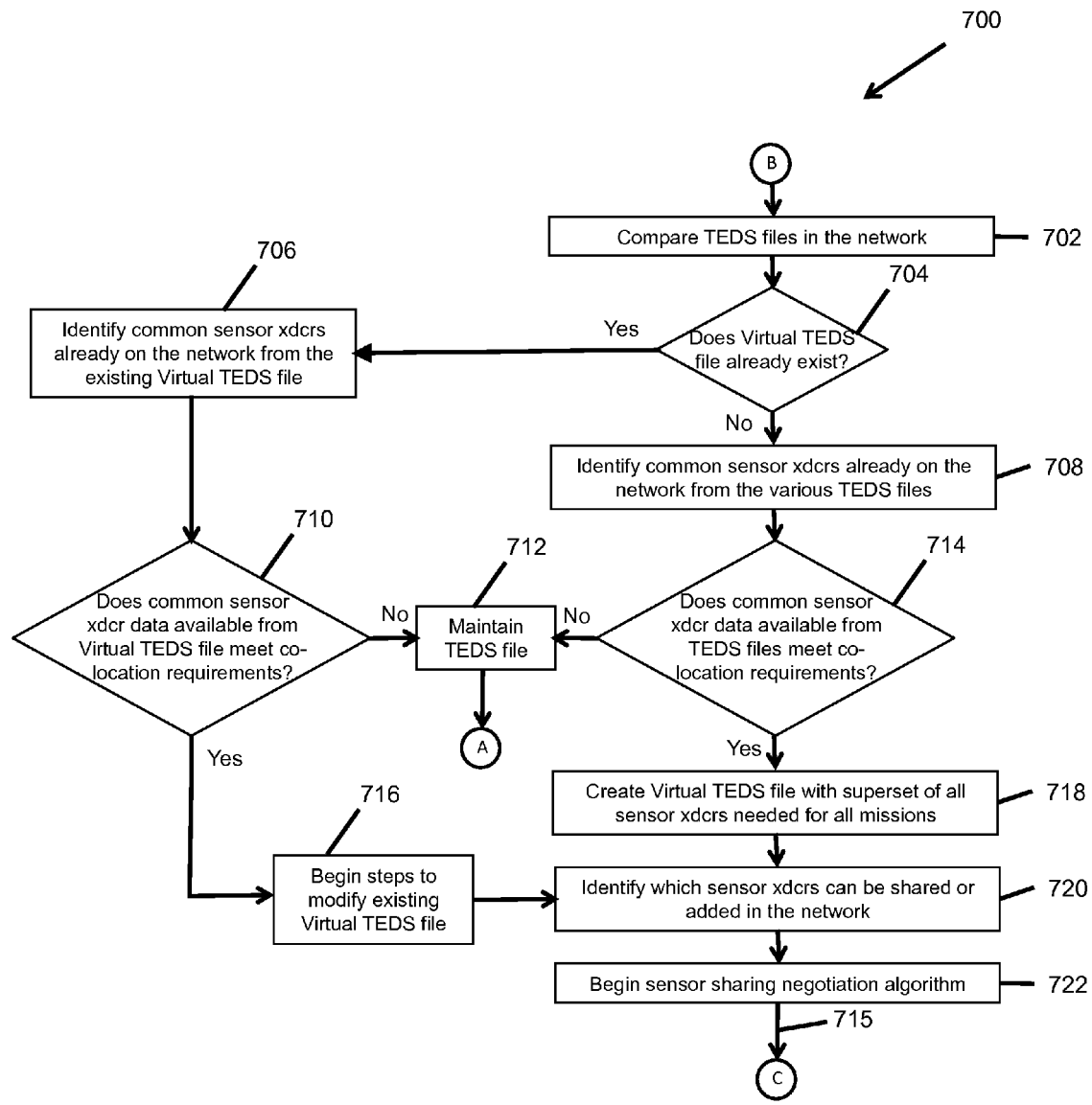
FIG. 7 is a logical flowchart showing an illustrative method for constructing a virtual sensor profile in accordance with some embodiments.

If duplicate sensor node data is found, at 620, then a method 700 for constructing a virtual sensor profile is implemented as illustrated in FIG. 7, and as indicated by an arrow 619 and a connector 13'. Accordingly, as shown in FIG. 7, each TEDS file in the sensor network is compared, at 702, to determine which sensors are required for the pre-defined mission configuration of each of the sensor nodes. At 704, it is determined whether a virtual TEDS file already exists.

If, at 704, it is found that a virtual TEDS file does already exist, then common sensors and actuators that are already on the sensor network are identified at 706, based on the existing virtual TEDS file. At 710, it is determined whether common sensor or actuator data available from the existing virtual TEDS file meets collocation requirements, meaning that the sensor nodes are within a range of one another such that a redundancy is established in the common sensor or actuator data. If not, one or more existing TEDS files are maintained, at 712, and a search continues for other sensor nodes in the sensor network, as indicated by connector 'A' of FIG. 7. In various embodiments, a sensor node TEDS file optionally overrides directives established by the virtual TEDS file. If, at 710, it is determined that the common sensor or actuator (i.e., transducer "xdcr") data available from the existing virtual TEDS file does meet collocation requirements, then the existing virtual TEDS file is modified at 716, as discussed further below (with respect to 720).

Returning to 704, if it is found that a virtual TEDS file does not already exist, then, at 708, common sensors or actuators that are already part of the sensor network are identified based on the TEDS files from the various sensor nodes. At 714, it is determined whether common sensor or actuator data available from the various existing TEDS files meets collocation requirements. If not, one or more existing TEDS files are maintained, at 712, and a search continues for other sensor nodes in the sensor network, as indicated by connector 'A' of FIG. 7. If, at 714, it is determined that the common sensor or actuator data available from the various existing TEDS files does meet collocation requirements, then a virtual TEDS file is created at 718. The virtual TEDS file describes a superset of all sensors and actuators needed for all missions to be supported in the sensor network.

The modification of an existing virtual TEDS file, or the creation of a new virtual TEDS file, is begun at 720 by identifying which sensors or actuators can be shared or added within the sensor network. A sensor sharing negotiation algorithm begins, at 722, and is more fully described with respect to FIG. 8, as indicated by an arrow 715 and a connector 'C'. Generally, the sharing negotiation algorithm occurs between nearby sensor nodes to determine which sensors or actuators in each sensor node remain on, which are turned off, and which may be alternately switched on and off or "strobed". Each sensor node on the sensor network shares its data with all other sensor nodes on the network, such that all sensor nodes have all data available for transmission to any requesting system or device.

Figure 8:
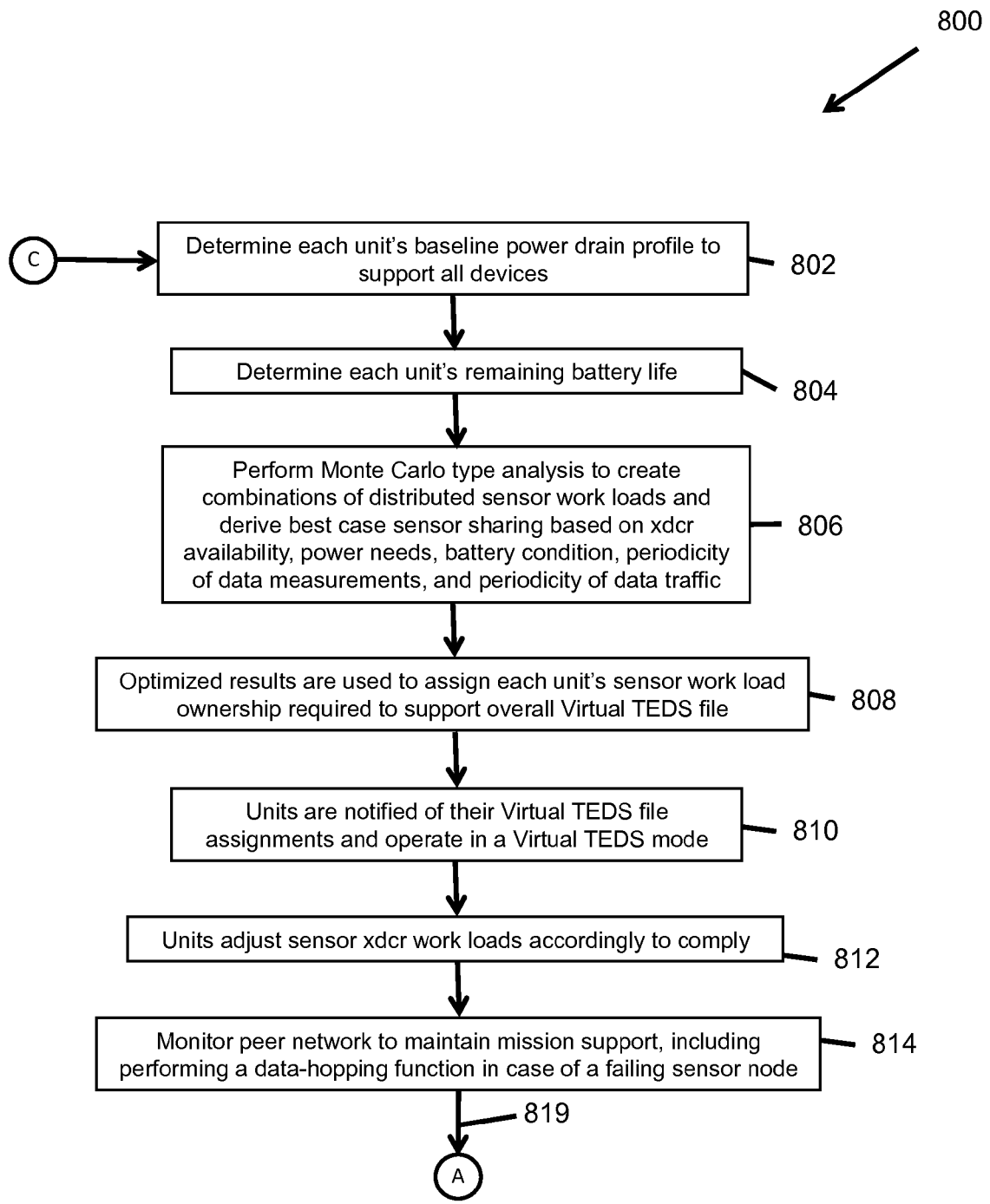
FIG. 8 is a logical flowchart showing an illustrative method for sharing sensor data in accordance with some embodiments.

Referring now to FIG. 8, an illustrative method 800 for sharing sensor data in accordance with some embodiments is illustrated. Accordingly, at 802, each sensor node or equivalently each "sensor unit" determines its baseline current drain profile which is defined as the current drain required to support all devices within the given sensor node. In addition to the baseline current drain profile, each sensor node determines its remaining battery life, at 804, to prioritize distribution of sensor work loads. At 806, a computational analysis, such as a Monte Carlo-type analysis, is performed to derive a best case or optimize sensor sharing and work load distribution scenario for the sensor nodes in the network to support the Virtual TEDS at a minimized (or best case scenario the minimum) power. The computational analysis is a statistical analysis that receives as input various information or data such as, but not limited to, sensor or actuator availability, sensor current drain profiles, remaining sensor battery life, periodicity of data measurements, or periodicity of data traffic or reporting, among others to generate the results. For example, with respect to remaining battery life and current drain profiles, prioritized work load distribution can be determined based on the following example guidelines: high current drain sensors or actuators are dedicated to sensor nodes having a high battery life; and low current drain sensors or actuators are dedicated to sensor nodes having a low battery life.

Optimized results of the analysis are used, at 808, to determine a power consumption "optimization hardware configuration", for each sensor node in the sensor node network, which is defined as the ON or OFF state of each sensor in the sensor node. Such a configuration includes a recommended sensor node work load ownership requirement to support the virtual TEDS file at lowest current drain conditions. At 810, each of the sensor nodes are notified of their virtual TEDS file hardware configuration assignments, and the sensor nodes operate in a virtual TEDS mode. As previously discussed, in some embodiments, a sensor node TEDS file optionally overrides the virtual TEDS assignment. Otherwise, the sensor nodes adjust their transducer work loads and maintain certain sensors in an ON state while turning other sensors to an OFF state or to strobe between an ON and OFF state, at 812, to comply with the virtual TEDS assignments.

At 814, the sensor network is monitored to maintain mission support for all the mission configurations in the sensor network. Further, in the event of a failure of an individual sensor or actuator within a sensor node, or in the event of the failure of the sensor node itself, embodiments of the present disclosure provide for effective continued support of the overall mission requirements of the sensor network. This is accomplished, at least in part, by transmitting mission critical data from sensor node to sensor node, in a so-called "data-hopping" routine, to a sensor node with sufficiently available power and appropriately collocated to the failed or failing sensor node to best continue to support the overall requirements of failing sensor node and of the sensor network.

The overall result of the methods described above is that the sensor nodes in the sensor network have reduced sensor loads and thus reduced current drain. Therefore, each sensor node, and the overall sensor network, achieves a longer operating life. Moreover, despite have a reduced sensor load, each sensor node still enjoys the full capacity of the virtual TEDS file that is shared by all sensor nodes in the sensor network, including access to all shared sensor data on the sensor network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method for managing power consumption in a sensor network, the method comprising:
   at a primary node, in the sensor network, having a primary node sensor profile:
   locating a secondary node, in the sensor network, having a secondary node sensor profile;
   comparing the secondary node sensor profile to the primary node sensor profile to construct a virtual sensor profile that reduces redundant sensor data gathering between the primary and secondary sensor nodes;
   determining a power consumption optimization hardware configuration for the secondary node to provide sensor data for the virtual sensor profile; and
   assigning the determined hardware configuration to the secondary node;
   wherein the primary node includes a first plurality of sensors and the secondary node includes a second plurality of sensors, the method further comprising;
   identifying a first sensor of the first plurality of sensors and a second sensor of the second plurality of sensors, where the first and second sensors are collocated and coupled to each other by the sensor network; and
   performing a sensor sharing negotiation function to reduce redundant sensor data gathering between the first sensor and the second sensor.

2. The method of claim 1 further comprising:
   determining a sharing permission for each of the primary node sensor profile and the secondary node sensor profile; and
   comparing the secondary node sensor profile to the primary node sensor profile to construct the virtual sensor profile only when the sharing permission permits allows of the two profiles.

3. The method of claim 1 further comprising:
   determining a presence of duplicate sensor node data between the primary node and the secondary node, wherein the virtual sensor profile is constructed to eliminate the duplicate sensor node data.

4. The method of claim 1, wherein the secondary node sensor profile has a secondary mission configuration, and the primary node sensor profile has a primary mission configuration, and the virtual sensor profile is constructed to support the primary and secondary mission configurations.

5. The method of claim 1 further comprising:
   identifying a sensor that is common to both the primary node and the secondary node;
   determining whether data collected by the common sensor meets a collocation requirement; and
   when the data collected by the common sensor meets the collocation requirement constructing the virtual sensor profile to eliminate duplicate data collected by the common sensor.

6. The method of claim 1, wherein assigning the determined hardware configuration to the secondary node comprises:
   changing a hardware configuration of the secondary node in accordance with the determined power consumption optimization hardware configuration to disable a sensor function in the secondary node.

7. The method of claim 1 further comprising:
   monitoring the sensor network for changing environmental and network conditions; and
   changing a hardware configuration of the secondary node to adapt to the changing conditions to maintain an overall mission support as defined for the sensor network.

8. A method for collaborative operation of a plurality of sensor units in a sensor network to manage power consumption in the sensor network, the method comprising:
at a first sensor unit of the plurality of sensor units:
determining an environment and power profile of the first sensor unit;
communicating with a second sensor unit of the plurality of sensor units to determine an environment and power profile of the second sensor unit;
comparing the environment and power profiles of the first and second sensor units to determine a power consumption optimization hardware configuration for each of the first and second sensor units; and
changing a hardware configuration of at least one of the first sensor unit or the second sensor unit in accordance with the determined power consumption optimization hardware configurations to disable a sensor function in at least one of the first or second sensor units.

9. The method of claim 8 further comprising:
determining a sharing permission for each of the environment and power profiles of the first and second sensor units; and
comparing the environment and power profiles of the first and second sensor units to determine a power consumption optimization hardware configuration for each of the first and second sensor units only when the sharing permission permits allows of the two profiles.

10. The method of claim 8 further comprising:
identifying a failing sensor unit in the plurality of sensor units; and
performing a data-hopping function to transmit data from the failing sensor unit to a functional sensor unit in the plurality of sensor units, the functional sensor unit having power and being collocated to the failing sensor unit to continue support of a mission configuration of the failing sensor unit.

11. The method of claim 8 further comprising:
determining a presence of duplicate sensor unit data between the first sensor unit and the second sensor unit, wherein the determined power consumption optimization hardware configurations eliminate the duplicate sensor unit data.

12. The method of claim 8 further comprising:
comparing a mission configuration of the first sensor unit to a mission configuration of the second sensor unit to construct a virtual sensor profile to reduce redundant sensor data gathering between the first and second sensor units and support both mission configurations.

13. The method of claim 8 further comprising:
identifying an individual sensor that is common to both the first sensor unit and the second sensor unit;
determining whether data collected by the individual sensor common to both the first and second sensor units meets a collocation requirement; and
when the data collected by the individual common sensor common to both the first and second sensor units meets the collocation requirement constructing a virtual sensor profile to reduce redundant sensor data gathering between the first and second sensor units.

14. The method of claim 8 further comprising:
identifying a first sensor of the first sensor unit and a second sensor of the second sensor unit, that are collocated and coupled to each other by the sensor network; and
performing a sensor sharing negotiation function to reduce redundant sensor data gathering between the first sensor and the second sensor.

15. The method of claim 8, wherein determining the power consumption optimization hardware configuration for each of the first and second sensor units further comprises:
determining a baseline power drain profile for each of the first and second sensor units;
determining a remaining battery life for each of the first and second sensor units based on the baseline power drain profile; and
performing a numerical analysis function to prioritize a distribution of sensor work loads for each of the first and second sensor units based on both the remaining battery life and the baseline power drain profile for each of the first and second sensor units.

16. A method for managing power consumption in a sensor network, the method comprising:
at a primary node, in the sensor network, having a primary node sensor profile:
locating a secondary node, in the sensor network, having a secondary node sensor profile;
comparing the secondary node sensor profile to the primary node sensor profile to construct a virtual sensor profile that reduces redundant sensor data gathering between the primary and secondary sensor nodes;
determining a power consumption optimization hardware configuration for the secondary node to provide sensor data for the virtual sensor profile; and
assigning the determined hardware configuration to the secondary node;
wherein determining the power consumption optimization hardware configuration further comprises:
determining a baseline power drain profile for each of the primary and secondary nodes;
determining a remaining battery life for each of the primary and secondary nodes based on the baseline power drain profile; and
performing a numerical analysis function to prioritize a distribution of sensor work loads for each of the primary and secondary nodes based on both the remaining battery life and the baseline power drain profile for each of the primary and secondary nodes.

* * * * *